US005663762A

United States Patent [19]

Nishiyama

[11] Patent Number: 5,663,762
[45] Date of Patent: Sep. 2, 1997

[54] ELECTRONIC VIEWER AUTOMATICALLY ADJUSTING MAGNIFICATION OF A FILM IMAGE IN ACCORDANCE WITH POSITION OF THE FILM IMAGE

[75] Inventor: Tomoyuki Nishiyama, Asaka, Japan

[73] Assignee: Fuji Photo Film Co., Ltd., Kanagawa, Japan

[21] Appl. No.: 545,312

[22] Filed: Oct. 19, 1995

[30] Foreign Application Priority Data

Oct. 24, 1994 [JP] Japan .................... 6-258065

[51] Int. Cl.⁶ ............... H04N 5/225; H04N 5/253
[52] U.S. Cl. ............... 348/373; 348/96; 348/358; 353/76; 353/119; 355/55; 355/72; 396/20; 396/428; 396/535; 386/128
[58] Field of Search .................. 358/474, 332; 348/96, 97, 98, 335, 340, 358, 373, 374, 375; 354/76, 77, 80; 353/68, 74, 76, 119; 355/72, 74, 75, 55; 396/20, 535, 428; H04N 5/225, 5/253

[56] References Cited

U.S. PATENT DOCUMENTS

| 2,243,084 | 5/1941 | Browne | 355/72 |
| 4,482,924 | 11/1984 | Brownstein | 358/302 |
| 4,803,505 | 2/1989 | Saijo et al. | 354/80 |
| 4,819,073 | 4/1989 | Bridges | 358/214 |
| 5,010,362 | 4/1991 | Otsuki et al. | 355/74 |
| 5,218,439 | 6/1993 | Mizoguchi et al. | 358/209 |
| 5,276,534 | 1/1994 | Mutze et al. | 358/487 |

*Primary Examiner*—Wendy Garber
*Assistant Examiner*—Ngoc-Yen Vu

[57] ABSTRACT

A cam cylinder is extended from a base member of a holder and is inserted into a guide cylinder secured to a main body. A lens mount including an optical system and a CCD is inserted into the cam cylinder. A guide pin is screwed on the lens mount through a guide groove of the guide cylinder and a cam groove of the cam cylinder. When the holder is rotated around the optical axis, the lens mount can move along the optical axis, so that a distance between the CCD and a film held by the holder is changed. As a result, by only rotating the holder, the magnification for displaying the image can be changed.

13 Claims, 11 Drawing Sheets

ELECTRONIC VIEWER AUTOMATICALLY ADJUSTING MAGNIFICATION OF A FILM IMAGE IN ACCORDANCE WITH POSITION OF THE FILM IMAGE

BACKGROUND OF THE INVENTION

1. Field of the Invention

The present invention relates to an electronic viewer, and more particularly to an electronic viewer picking up an object such as a negative or positive film and others by means of a solid state imaging device and producing a video signal so as to display an image.

2. Description of the Related Art

A conventional electronic viewer includes an optical system for picking-up an image, a solid state imaging device (CCD) and an image processing circuit in a main body thereof. An optical image of a subject passes through the optical system and is formed on a light acceptance surface of the CCD. The CCD transmits an image signal to the image processing circuit so as to convert the image signal into a video signal. The video signal is transmitted to a display unit such as a TV monitor, etc.

The applicant of the present invention provides an electronic viewer of this kind. For the electronic viewer, a negative film or a slide film is held in a film carrier. The viewer holds the film carrier with a holding member for the film carrier and picks up a film image by means of the CCD.

Here, photographing is carried not out only with holding a camera laterally (normally) but also with holding the camera vertically. That is, the camera is rotated by 90° when a user desires to photograph something tall or large, etc. Accordingly, there are both images photographed laterally (lateral image) and images photographed vertically (vertical image) on the film. For example, in the case that the film image is picked up in accordance with the lateral image, the vertical image is laid by 90° on the display unit. In this case, the holding member is rotated by 90°, so that the vertical image can be erect.

When the vertical image is erect under the magnification for picking up the lateral image, however, the image shall be displayed with missing parts, that is, the upper and lower parts of the image can not be displayed because of the difference of aspect ratio. In this case, the magnification of the optical system is adjusted to be reduced with a zooming dial, so that the film image can be displayed without missing parts.

As a result, the conventional electronic viewer faces the problem that an operation is complicated because the magnification should be changed by operating the zoom dial every time the film image is changed between the lateral image and the vertical image.

SUMMARY OF THE INVENTION

The present invention has been developed in view of the above-described circumstances, and has its aim the provision of an electronic viewer capable of changing the magnification for picking up with a simple operation.

In order to achieve the above-mentioned object, the electronic viewer of the present invention mainly comprises a main body, illuminating means, a lens mount, a solid state imaging device, a holder, and a zoom mechanism. The lens mount is provided within the main body and includes an optical system therein. The solid state imaging device is secured the lens mount in such a manner to be positioned below the optical system. The image processing circuit accepts an optical image from the optical system and generates an image signal indicating the optical image. The image processing circuit is provided in the main body. The circuit receives the image signal from the solid state imaging device and converts the signal into a video signal. The video signal is transmitted to a display unit which is electrically connected with the electronic viewer. The holder is provided on a top of the main body in such a manner to be positioned above the optical system of the main body and holds a film carrier housing the film. The film carrier can be inserted into and retracted from the holder. The holder can be rotated around an optical axis of the optical system. The zoom mechanism moves the lens mount together with the solid state imaging device along the optical axis in association with a rotation of the holder in order to change a magnification for displaying the film image on the film.

According to the present invention, when the holder is rotated, the lens mount is moved along the optical axis of the optical system in association with the rotation of the holder by means of the zoom mechanism. As a result, the distance between the film held by the holder and a light acceptance surface of the solid state image device is changed, so that the size of the image formed on the light acceptance surface of the solid state imaging device can be changed. As a result, the magnification for displaying the image can be easily changed by only the holder.

According to the preferred embodiment of the present invention, the zoom mechanism sets a first magnification for completely displaying a lateral image of the film in the film carrier on a screen of the display unit without missing parts when the holder is positioned at a first position, and the zoom mechanism moves the lens mount so as to set a second magnification for completely displaying a vertical image of the film on the screen without missing parts when the holder is rotated from the first position to a second position.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein.

DESCRIPTION OF THE PREFERRED EMBODIMENT

Detailed description will hereunder be given of the preferred embodiment of an electronic viewer according to the present invention with reference to the accompanying drawings.

Figure 1:
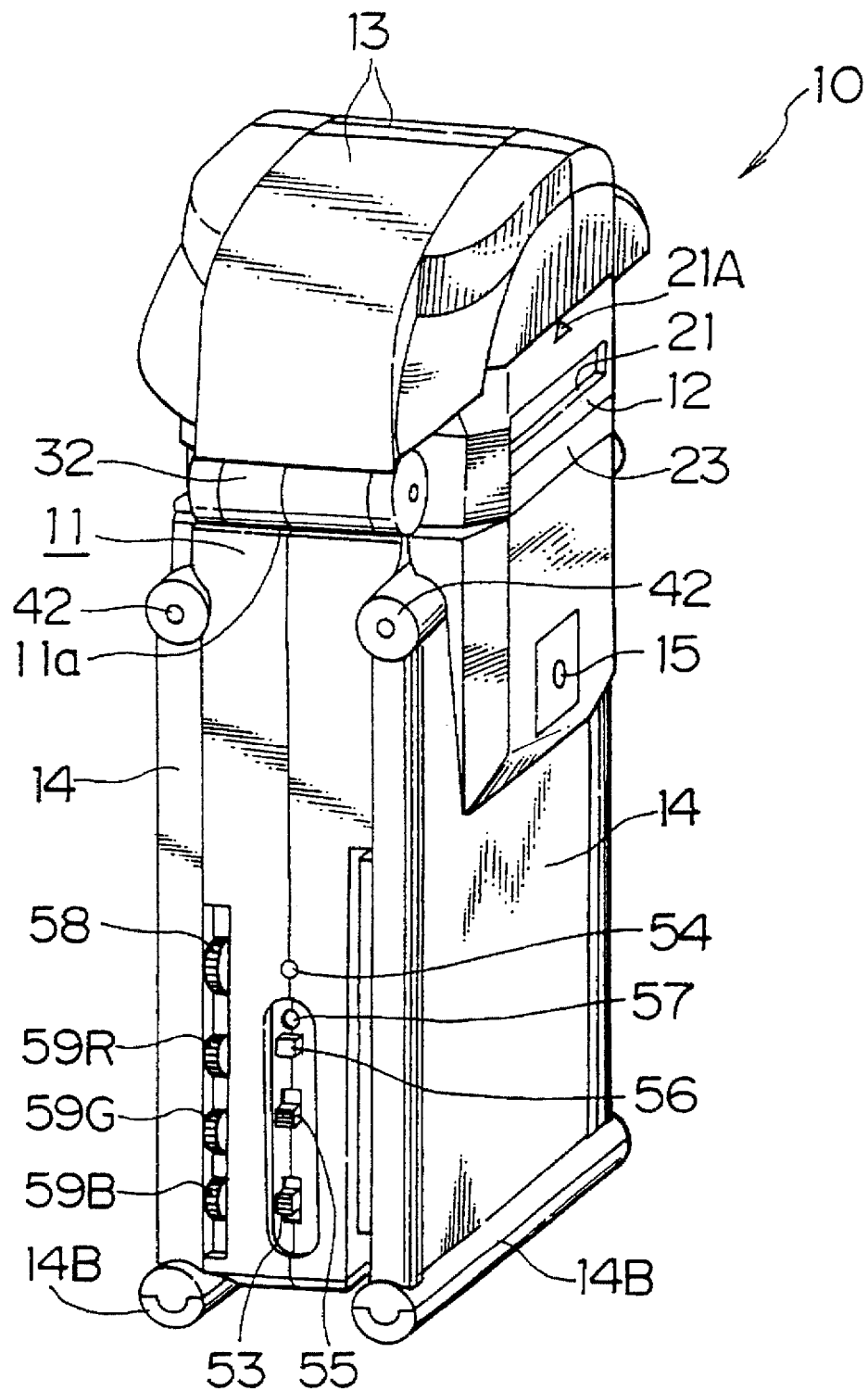
FIG. 1 is a perspective view of an electronic viewer according to the present invention taken from the front thereof.
Figure 2:
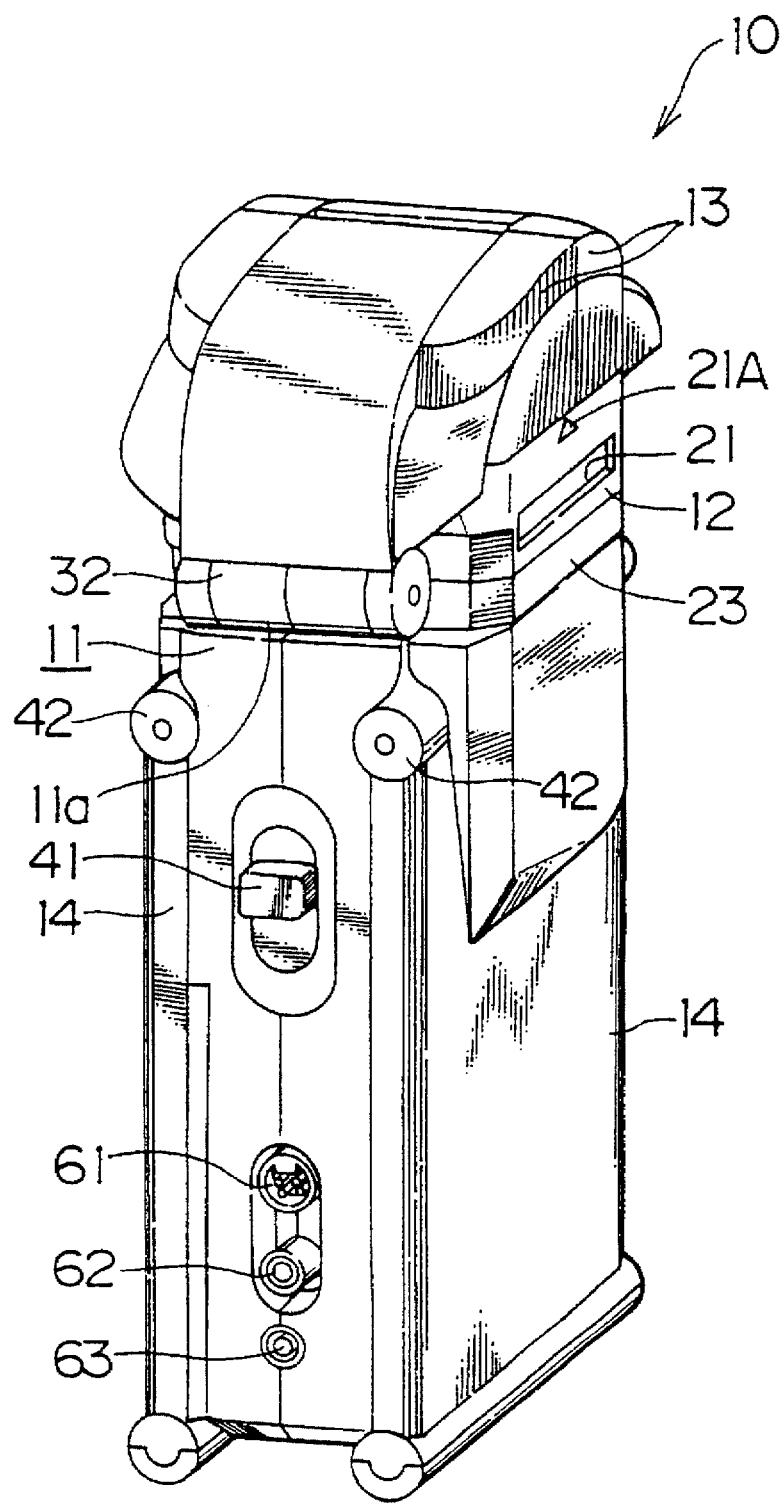
FIG. 2 is a perspective view of the electronic viewer of FIG. 1 taken from the back thereof.

FIG. 1 is a perspective view of an electronic viewer according to the present invention taken from the front thereof. FIG. 2 is a perspective view taken from back side. The right and left sides are wider than the front and the back of the electric viewer.

Figure 3:
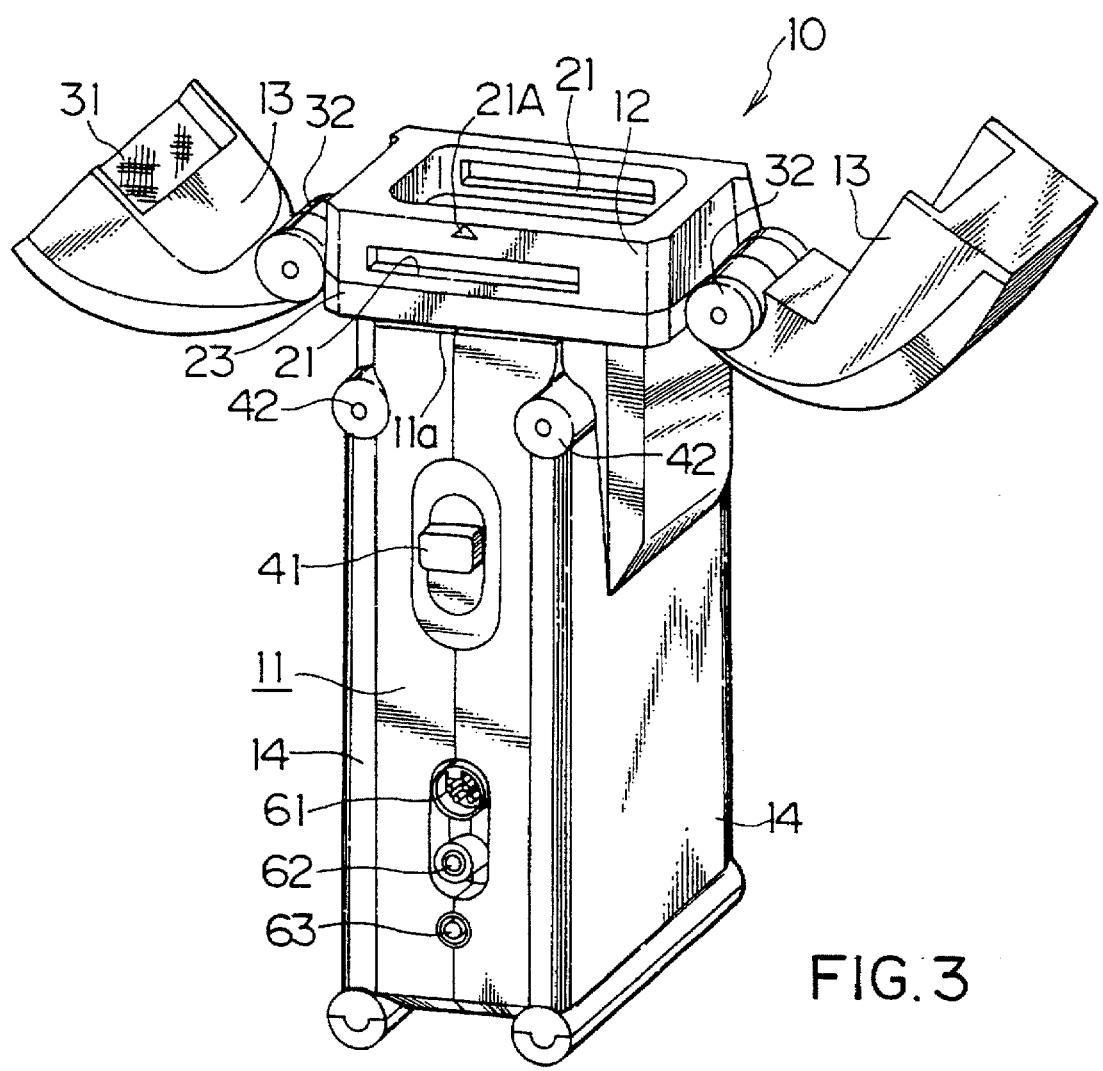
FIG. 3 is a perspective view illustrating a state that a head cover of the electronic viewer of FIG. 1 is opened.
Figure 4:
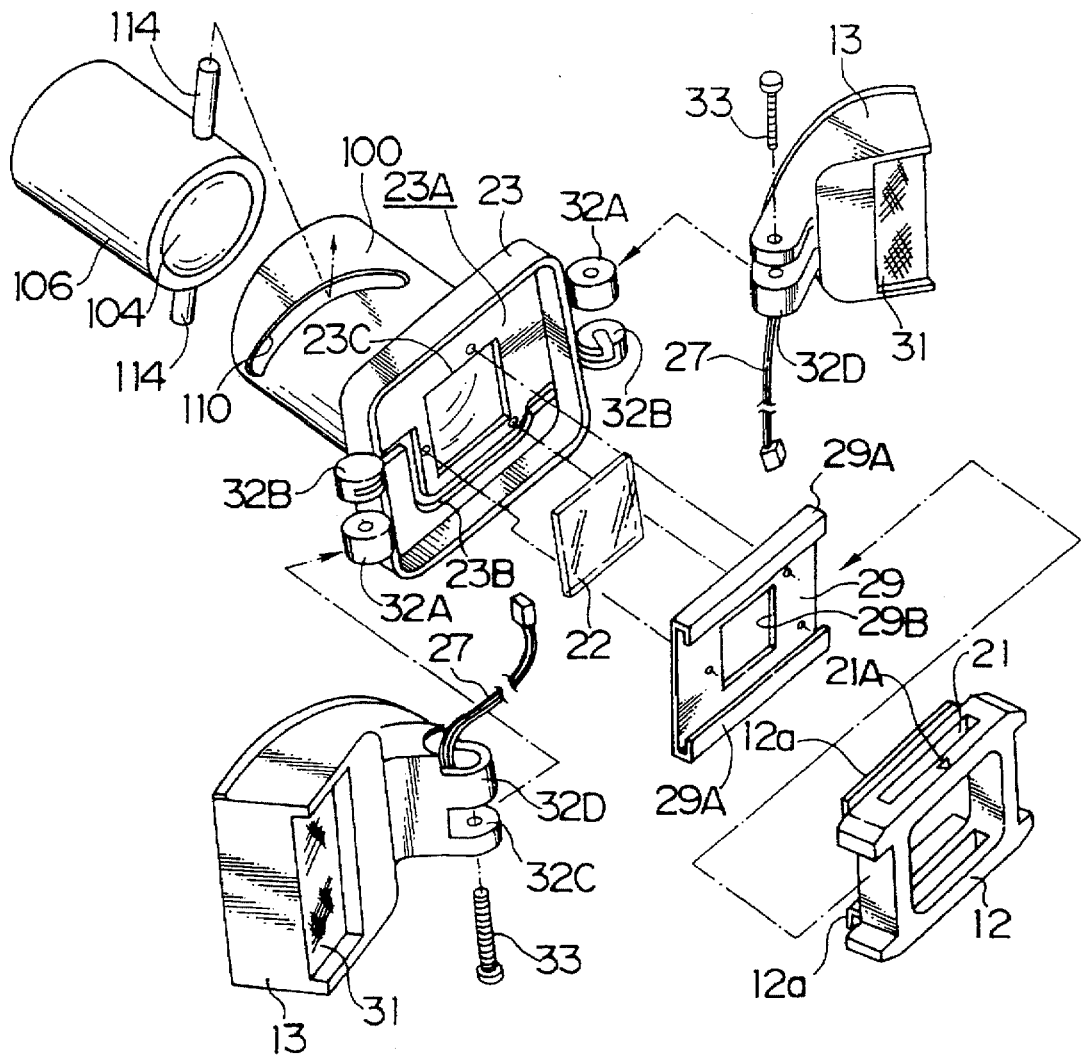
FIG. 4 is a perspective and exploded view explaining around the a base and a carrier holder.
Figure 5:
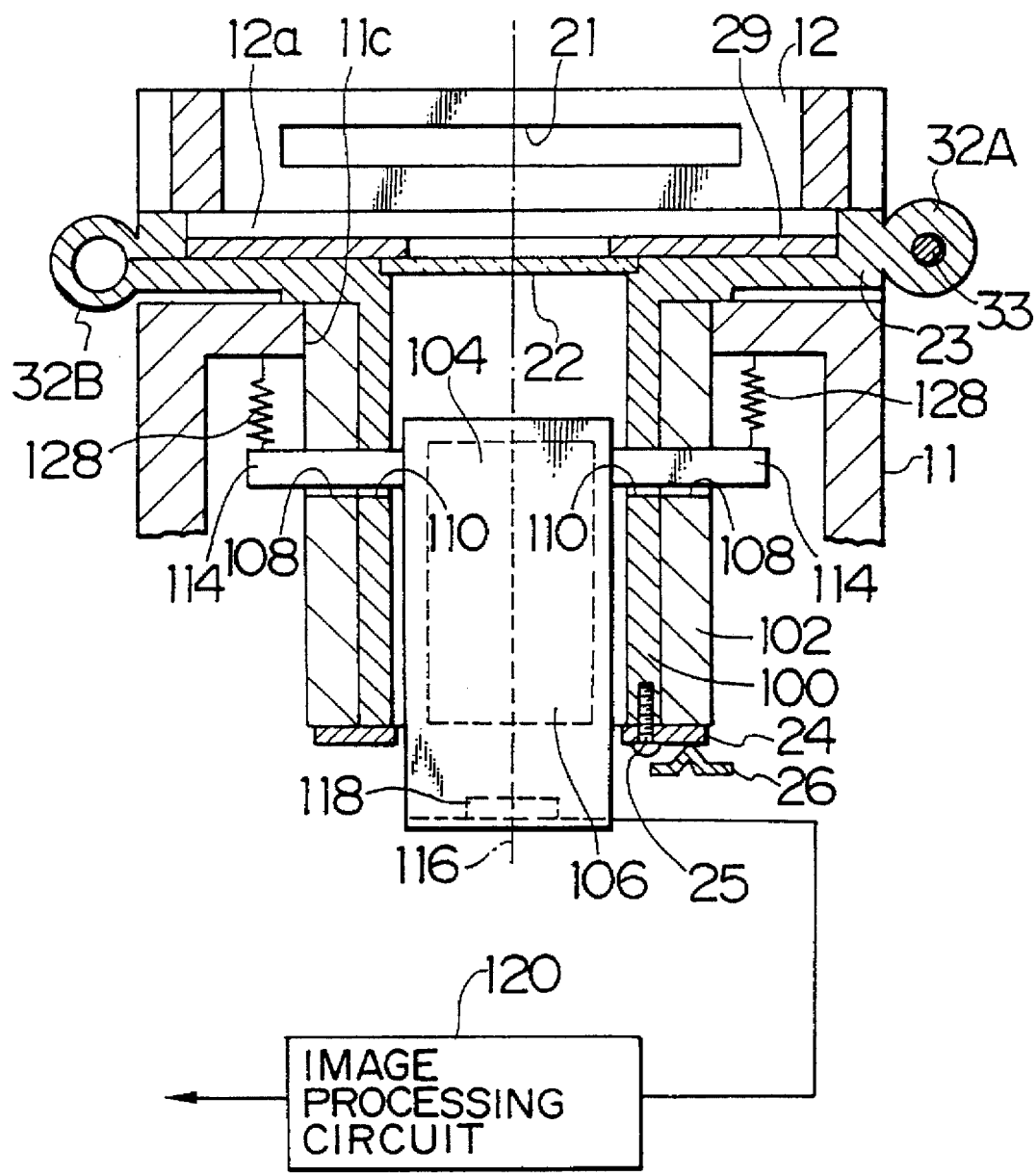
FIG. 5 is a sectional view illustrating a structure around the holder attached on the base member.

The electronic viewer 10 has a main body 11 which is a substantially rectangular-parallelepiped. As shown in FIGS. 4 and 5, the main body 11 includes an optical system 104 for picking up an image, a CCD 118 (a solid state imaging device), an image processing circuit and the like therein, which will be described later. The optical system 104 is located at the upper part of the main body 11. A circular opening 11C is provided at a central part on an upper end of the main body 11. A cam cylinder 100 is extended from a base member 23 and is inserted into the main body 11 with a guide cylinder 102. The base member can be rotated at least from the front to the right or left by 90° (refer to FIG. 1, 2 and 3). A TV monitor is connected with the electronic viewer 10, so that an image can be displayed. Detailed description of the base member 23, the cam cylinder 100, the guide cylinder 102 and the like will be given later.

Figure 8:
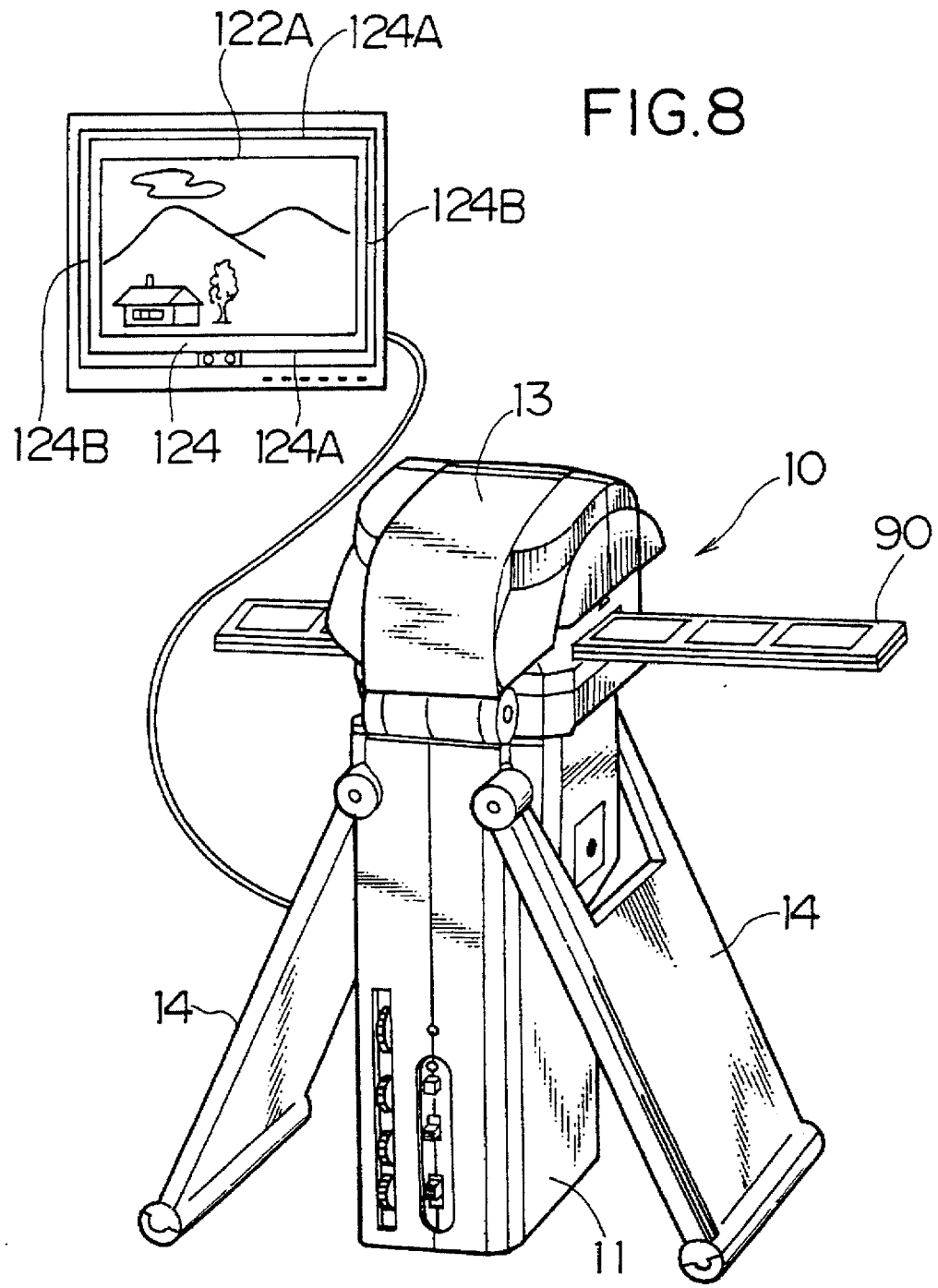
FIG. 8 is an explanatory view explaining how to use an electronic viewer for displaying a lateral film image.

Leg plates 14 and 14 are provided on the right and left sides (wider sides) of the main body 11 with hinges 42 provided at the upper part of the main body 11, so that the leg plates 14 and 14 can be opened and closed freely (refer to FIG. 8 as for an opening state). When the leg plates 14 are closed, the leg plates 14 are settled along the right and left sides of the main body 11 and its bottom end portions 14B and 14B projects from a bottom surface of the body 11 towards below.

As shown in FIG. 1, a power source switch 53, an indicator lamp 54 for power source, a changeover switch 55 for negative black-white/negative/positive, a button 56 for automatically setting tinge/brightness, an indicator lamp 57 for automatic setting of tinge/brightness, a dial 58 for adjusting brightness, and dials 59R, 59G and 59B for adjusting tinge are provided on the front of the main body 11. Further, a lock release button 41, a separate terminal 61, a video signal output terminal 62 and a DC input terminal 63 are respectively provided at the back of the main body 11 as shown in FIG. 2.

FIG. 4 is an exploded view illustrating the carrier holder 12 and the base member 23, the cam cylinder 100 etc., and FIG. 5 is a sectional view around the base member.

A holder 12 for holding a film carrier, which will be described later, is fixed on the base member 23 (see FIGS. 1 and 2). The holder 12 can be rotated together with the base member 23 at least within a range of 90°. The holder 12 is a substantially square frame. Slits 21 and 21 are formed on the opposite sides of the holder 12 as shown in FIG. 1 and 2. The film carrier is able to enter and retract from the slits 21 and 21. Also, a positioning mark 21A is provided above the central part of the slit 21 into which the film carrier is to be inserted.

The base member 23 is a substantially square tray, and has an opening 23C at the central part of a surface 23A, so that an optical image comes into the optical system in the main body 11. A guide 29 made of an elastic material is attached on the surface 23A. A rectangular window 29B is formed at the center of the guide 29. In order to protect the optical system located in the upper portion of the main body 11, a protective glass 22 is provided between the surface 23A and the guide 29. The upper and lower ends of the guide 29 are folded so as to form folded parts 29A and 29A. The folded parts 29A and 29A are securely and movably engaged with rails 12a and 12a formed on the holder 12 because of an elasticity of the guides 29A and 29A.

The cam cylinder 100 is integrated with the base member 23 in such a manner to extend from central part of the back surface of the base member 23. A lens mount 106 is inserted into the cam cylinder 100. The optical system 104 is arranged within a lens mount 106. Further, the CCD 118 is secured to the lens mount 106 in such a manner to be positioned below the optical system 104. The cam cylinder 100 is inserted into the guide cylinder 102 which is secured to the inner periphery of the circular opening 11c of the viewer main body 11 as shown in FIG. 5. The cam cylinder 100 can be rotated around an optical axis 116 of the optical system 104 within the guide cylinder 102, so that the base member 23 can be rotated around an optical axis 114. The lens mount 106, the cam cylinder 100 and the guide cylinder 102 comprise a zoom mechanism described later.

The guide cylinder 102 is held by the base member 23 and an end plate 24 attached to the bottom of the cam cylinder 100 at three points by a screw 25. The end plate 24 is an annular plate having a annular window at the center thereof. Two grooves are formed on a bottom surface of the end plate 24 at 90° intervals. A click spring 26 is fixed on a supporting member (not shown in the drawing) which is provided at the main body 11 as shown in FIG. 5. The click spring 26 contacts the bottom surface of the end plate 24, and the top of the click spring 26 is engaged with the grooves of the end plate 24. As a result, the base member (the holder 12) is positioned at two positions where the grooves of the end plate 24 are engaged with the click spring 26.

Head covers 13 and 13 are provided in such a manner to cover the holder 12. The head covers 13 and 13 are connected by means of hinges 32 and 32 on the opposite sides of the base member 23, in which the slits 21 and 21 are not provided. As a result, the head covers can be opened and closed as shown in FIG. 2 and 3. The hinge 32 comprises two cylindrical portions 32A and 32B formed in the base member 23 and two cylindrical portions 32C and 32D formed in the head cover 13. As shown in FIG. 4, the cylindrical portion 32A is located between the cylindrical portions 32C and 32D, and a screw 33 is inserted into these cylindrical portions. The screw 33 is engaged with a female screw formed within the cylindrical portion 32D. A groove is formed on the cylindrical portion 32B, which is not associated with a hinge function.

An illumination lamp 31 is provided on the inner side of the head covers 13 and 13 in order to illuminate a film image on the film carrier. A cord 27 for supplying electric power to the illumination lamp 31 is arranged via a hole formed on the base member 23, a groove 23B formed on the base member 23 and the grove of the cylindrical portion 32B. It reaches the illumination lamp 31 through a hole formed on the cylindrical portion 32D.

The head cover 13 is completely opened in a state that the carrier holder 12 is rotated by 90°. At the upper portion of the main body 11, a slope 11a is formed for determining the maximum opening amount of the head covers 13. Also, the hinge 32 is tight. As a result, when the head covers 13 are opened (see FIG. 3), the top level of the head covers 13 is equal to or slightly lower than that of the top surface of the holder 12. When the head covers 13 are closed, the head covers 13 keep closed condition because of the friction in the hinges 32.

Figure 6:
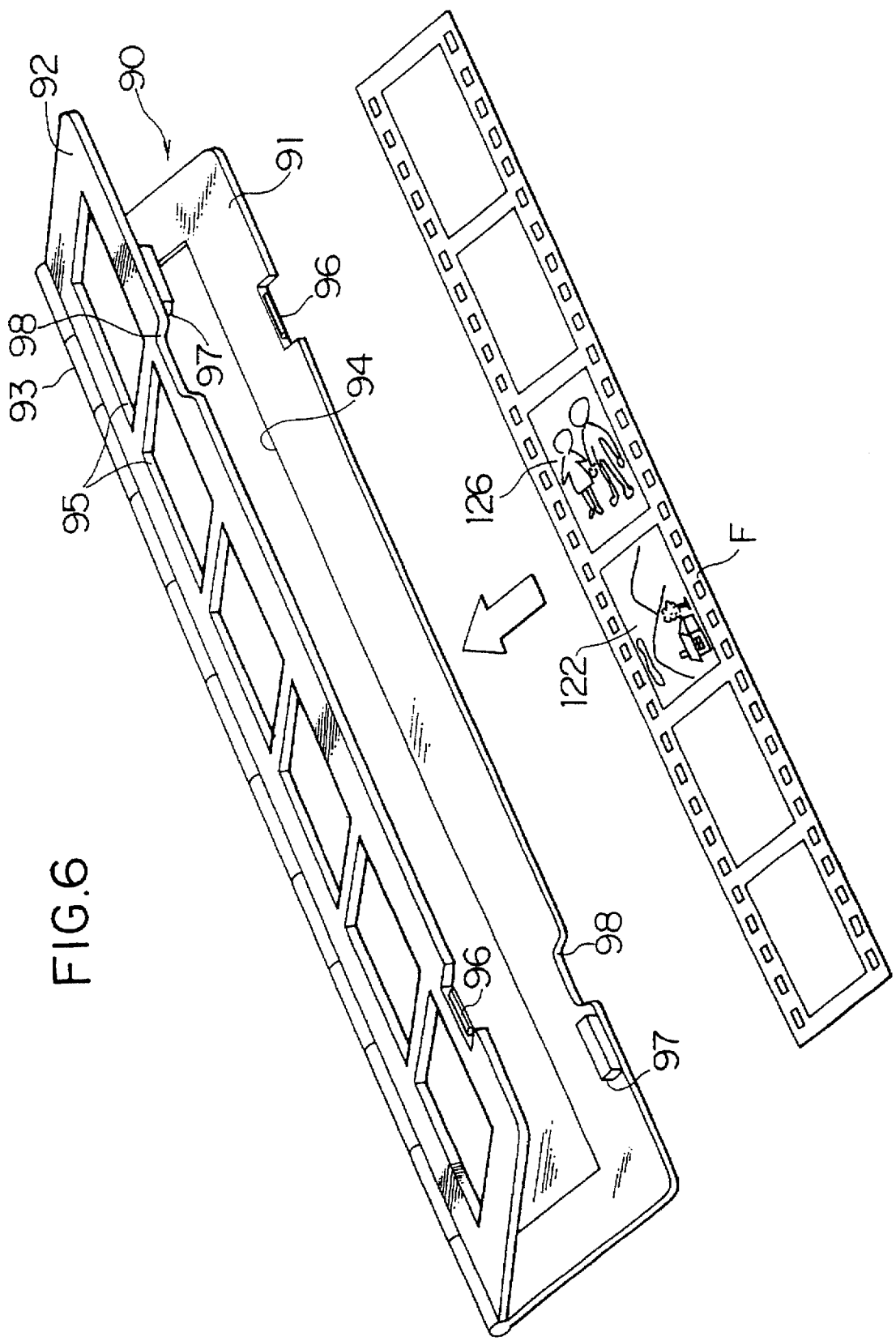
FIG. 6 is a perspective view illustrating a film carrier.

FIG. 6 shows an embodiment of the film carrier. The film carrier 90 comprises an upper plate 92 and a lower plate 91. The plates 91 and 92 are connected with each other by means of a hinge 93, so that the film carrier 90 can be opened and closed freely. The upper plate 92 is milky colored, and serves as a diffusion plate. A shallow concave part 94 for storing a negative film F is formed on an upper surface of the plate 91. The upper plate 92 is provided with plurality of windows 95 for exposing each frame of the negative film F stored in the concave part 94. The lower plate 91 is provided with a click 96 and a catch 97 respectively on the edge thereof. The upper plate 92 have the catch 97 engaged with the click 96 of the lower plate 92, and the click 96 engaged with the catch 97 of the plate 92. Further, the plates 91 and 92 include a notch 98 for easy opening. The negative film F is stored in the concave portion 94 in a state that both plates 91 and 92 are opened. When both plates 91 and 92 are closed, the click 96 is engaged with the catch 97 so that the film carrier 90 can be kept closed.

Figure 7:
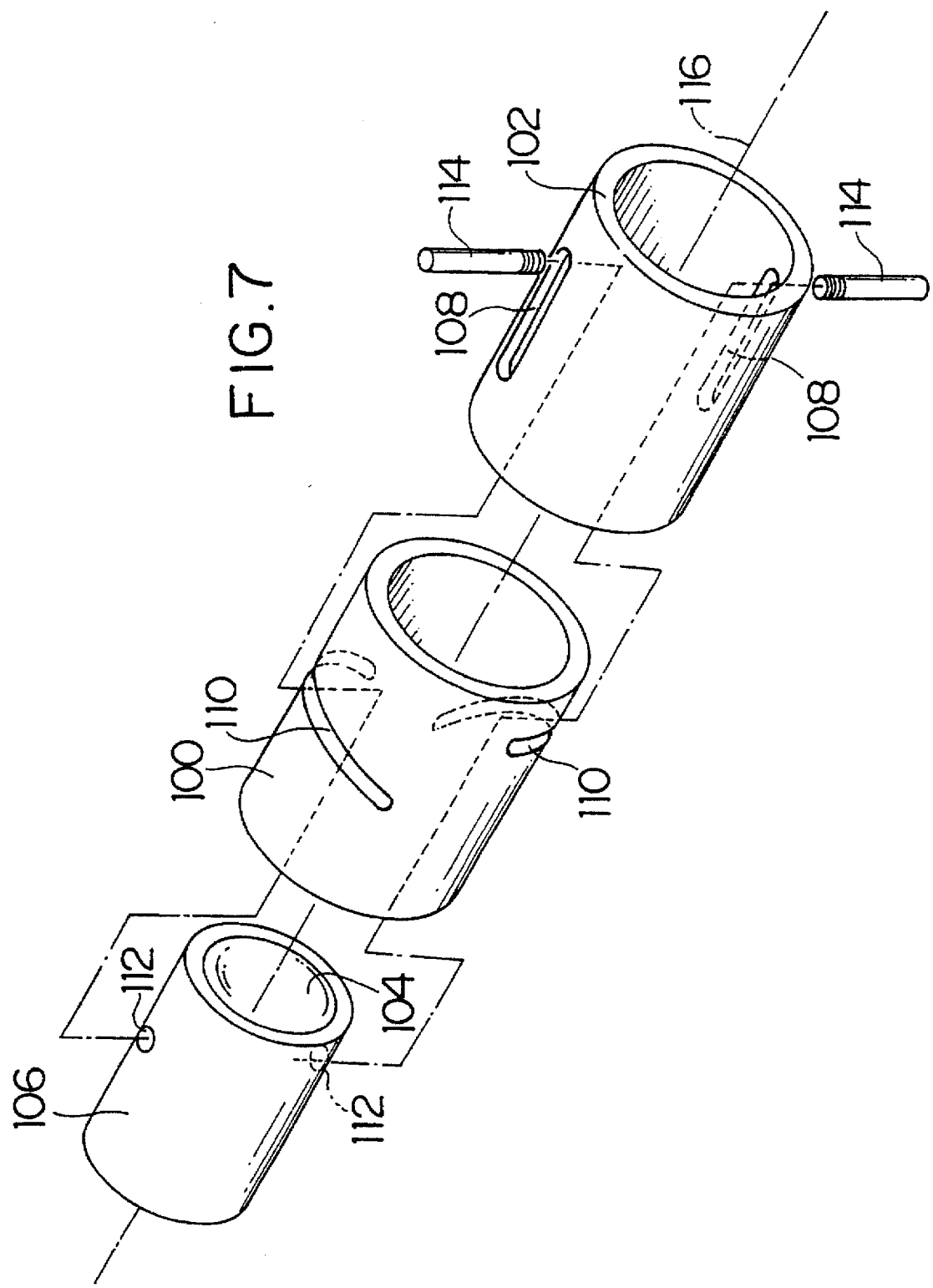
FIG. 7 is a perspective view illustrating a zoom mechanism of a lens mount.
Figure 9:
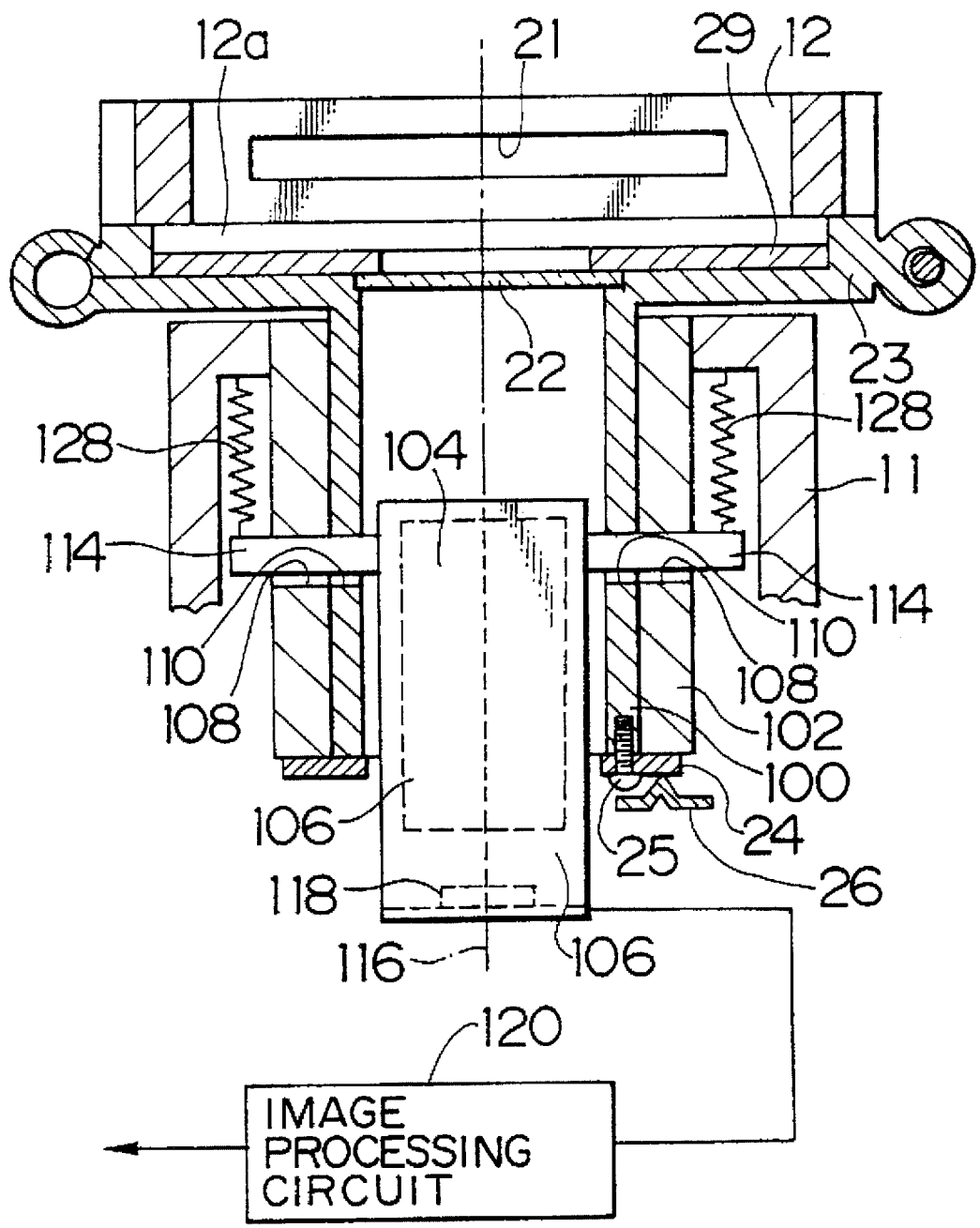
FIG. 9 is a sectional view illustrating the zoom mechanism in a state that the distance between the lens mount and the CCD is the shortest in a zoom mechanism.

Next, an explanation will hereunder be given of the zoom mechanism. The lens mount 106 including the optical system 104 and the CCD 118, the cam cylinder 100, the guide cylinder 102 and the like comprise a zoom mechanism as mentioned above. As shown in FIG. 7, two guide grooves 108 and 108 are oppositely formed on an outer peripheral surface of the guide cylinder 102. The guide grooves 108 extend in an axial direction of the guide cylinder 102. Two cam grooves 110 and 110 are symmetrically formed on an outer periphery of the cam cylinder 100. The cam cylinder 100 is inserted into the guide cylinder 102. Two female screw holes 112 and 112 are symmetrically formed on the lens mount 106. The lens mount 106 is inserted into the cam cylinder 100. Guide pins 114 and 114 are screwed into the female screw holes 112 and 112 through the guide grooves 108 and the cam grooves 110. The guide pins 114 and 114 are connected with the main body 11 by springs 128 as shown in FIGS. 5 and 9. The guide pin 114 is pressed against an upper edge part of the cam grooves 110 and that of the guide groove 108 by a force of the spring 128. Therefore, the looseness between the guide pin 114 and the cam groove 110/the guide groove 108 can be decreased by a function of the springs 128.

Accordingly, when the holder 12 of FIG. 5 is rotated around the optical axis 116 of the optical system 104 together with the base member 23, the cam cylinder 100 is rotated within the guide cylinder 102. At this time, the lens mount 106 moves upward and downward together with the CCD 118 within the cam cylinder 100 along the optical axis 116 by the function of the guide groove 108, the cam groove 110 and the guide pin 114, so that the distance between the film F held by the film carrier 90 and a light acceptance surface of the CCD 118 can be changed. As a result, it is possible to change the size of the image formed on the light acceptance surface of the solid state imaging device, so that a magnification for displaying the image can be changed. The relationship between the distance and the magnification for displaying are as follows.

(1) The distance between the film F housed in the film carrier 90 and the light acceptance surface of the CCD 118 is the shortest (refer to FIG. 5) in the case when the holder 12 is rotated and positioned as shown in FIGS. 1 and 8 (the slits 21 are positioned at the right and left sides of the electronic viewer: first position). The size of the image formed on the light acceptance surface of the solid state imaging device is large. At this time, the magnification is set as a first (high) magnification for displaying the lateral image without missing parts on the TV monitor. A lateral film image 122 on the negative film F of FIG. 6 is erected on the TV screen 124 in such a manner that the long (lateral) side 122A is shorter than the long (lateral) side 124A of the TV screen 124 and longer than the short (vertical) side 124B (124B<122A<124A) as shown in FIG. 8.

Figure 10:
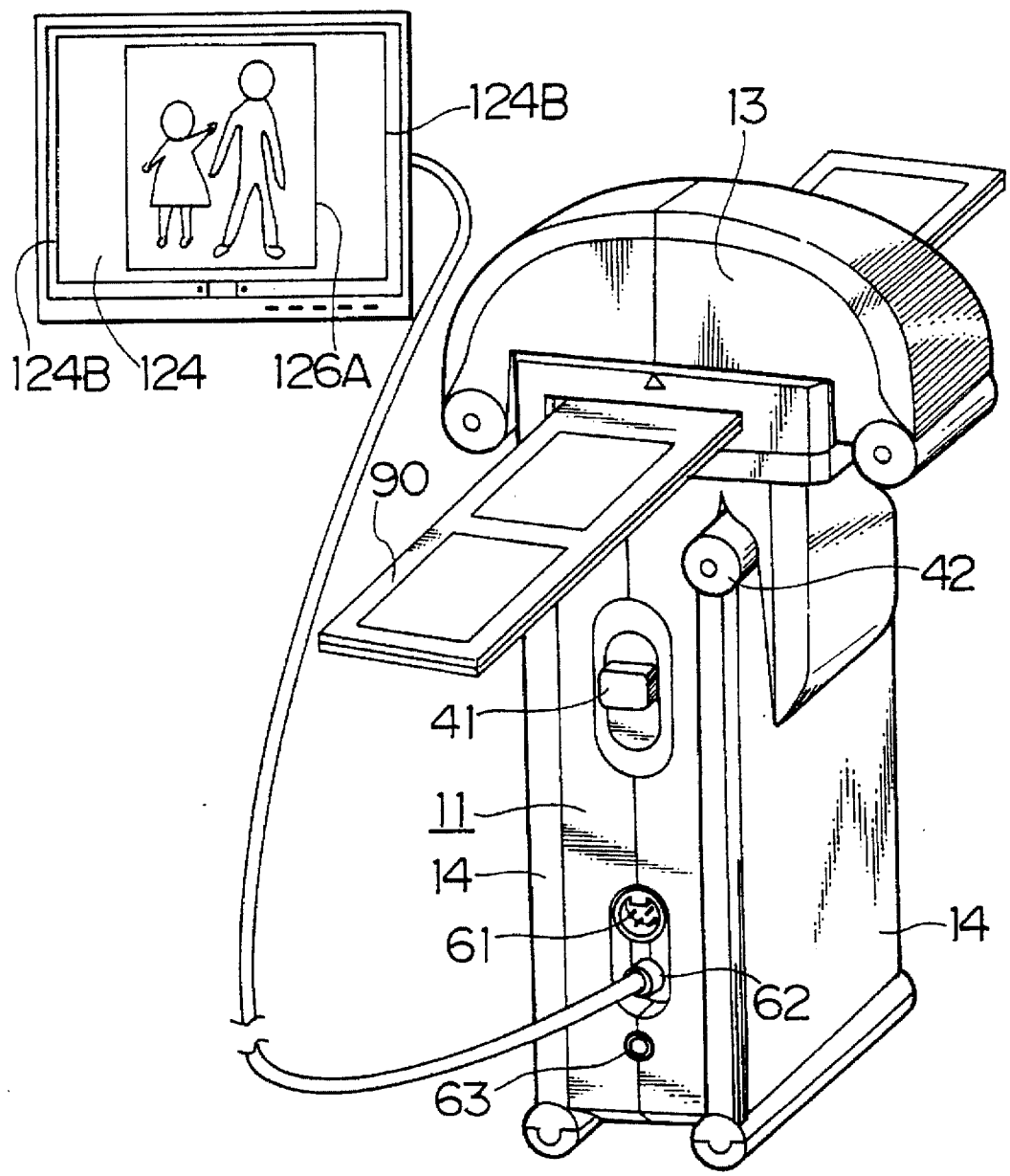
FIG. 10 is an explanatory view explaining how to use the electronic viewer for displaying a vertical film image.

(2) The distance between the film F housed in the film carrier 90 and the light acceptance surface of the CCD 118 is the longest (refer to FIG. 9) in the case when the holder 12 is rotated and positioned as shown in FIGS. 3 and 10 (the slits 21 are positioned at the front and the back of the electronic viewer: second position). The size of the image formed on the light acceptance surface of the solid state imaging device is small. At this time, the magnification is set as a second (low) magnification for displaying the vertical image without missing parts on the TV monitor. A vertical film image 126 on the negative film F of FIG. 6 is erected on the TV screen 124 in such a manner that the long (lateral) side 122A is shorter than the short (vertical) side 124B (122A<124B) as shown in FIG. 10.

The shape of the cam grooves 110 is decided in such a manner to satisfy the above-mentioned condition (1) and (2).

The second magnification is low magnification when compared with the first magnification.

The CCD 118 outputs an image signal indicating the optical image to a signal processing circuit 120. Then, the image signal is converted into a video signal by the signal processing circuit 120. The video signal is transmitted to the video signal output terminal 62 (see FIG. 3).

Next, an explanation will hereunder be given of how to use the electronic viewer constructed in the above-mentioned manner.

At first, the electronic viewer 10 is connected with the TV monitor for displaying an image. The leg plates 14 and 14 are opened, and the electronic viewer 10 is stood as shown in FIG. 8. Then, the film carrier 90 storing the negative film F is inserted into the slit 21. At that time, the head cover 13 is kept closed. Next, a negative mode is selected by operating the changeover switch 55, and the power source switch 53 is turned on so that the illumination lamp 31 can be illuminated. As a result, light from the illumination lamp 31 illuminates a film image located above the optical system 104 in the main body 11. Then, an image light transmits through the optical system 104 and is picked up by the CCD 118. The CCD 118 outputs an image signal to the signal processing circuit 120. Then, the signal processing circuit 120 converts the image signal into a video signal. The video signal is transmitted to the TV monitor via an electronic cable. The picked-up photo image is displayed on a TV screen 124.

Here, the electronic viewer 10 can erect the lateral image on the film F when the slits 21 of the holder 12 are positioned at the right and left sides of the viewer as shown in FIG. 8. At this time, the image is picked up under the condition that the distance between the film F housed in the film carrier 90 and the light acceptance surface of the CCD 118 is the shortest. Therefore, the size of the image formed on the light acceptance surface of the solid state imaging device is large. As a result, the lateral image on the film F can be erected without missing parts on the TV monitor as shown in FIG. 8.

In order to erect the vertical film image, the holder 12 is rotated by 90° and positioned as shown in FIG. 10, that is, the slits 21 of the holder 12 are positioned at the front and back of the viewer as shown in FIG. 10. In this case, the film image is picked up under the condition that the distance between the film F housed in the film carrier 90 and the light acceptance surface of the CCD 118 is the longest. Therefore, the size of the image formed on the light acceptance surface of the solid state imaging device is small. As a result, the vertical image of the film is erect on the screen and the image is displayed without missing parts on the TV monitor.

According to the electronic viewer in this embodiment, only if the holder 12 is rotated, the magnification can be changed so as to displaying the lateral image or the vertical image. Therefore, it is not required to operate the zooming dial so as to change the magnification for picking up the image. As a result, the electronic viewer in this embodiment can erect the lateral and vertical images without missing parts on the display unit with a simple operation.

Moreover, if the top-bottom and right-left of the film image is not decided, it is possible to rotate the holder 12 within the range 0°–90°, so that the magnification for displaying the image can be freely designated.

Figure 11:
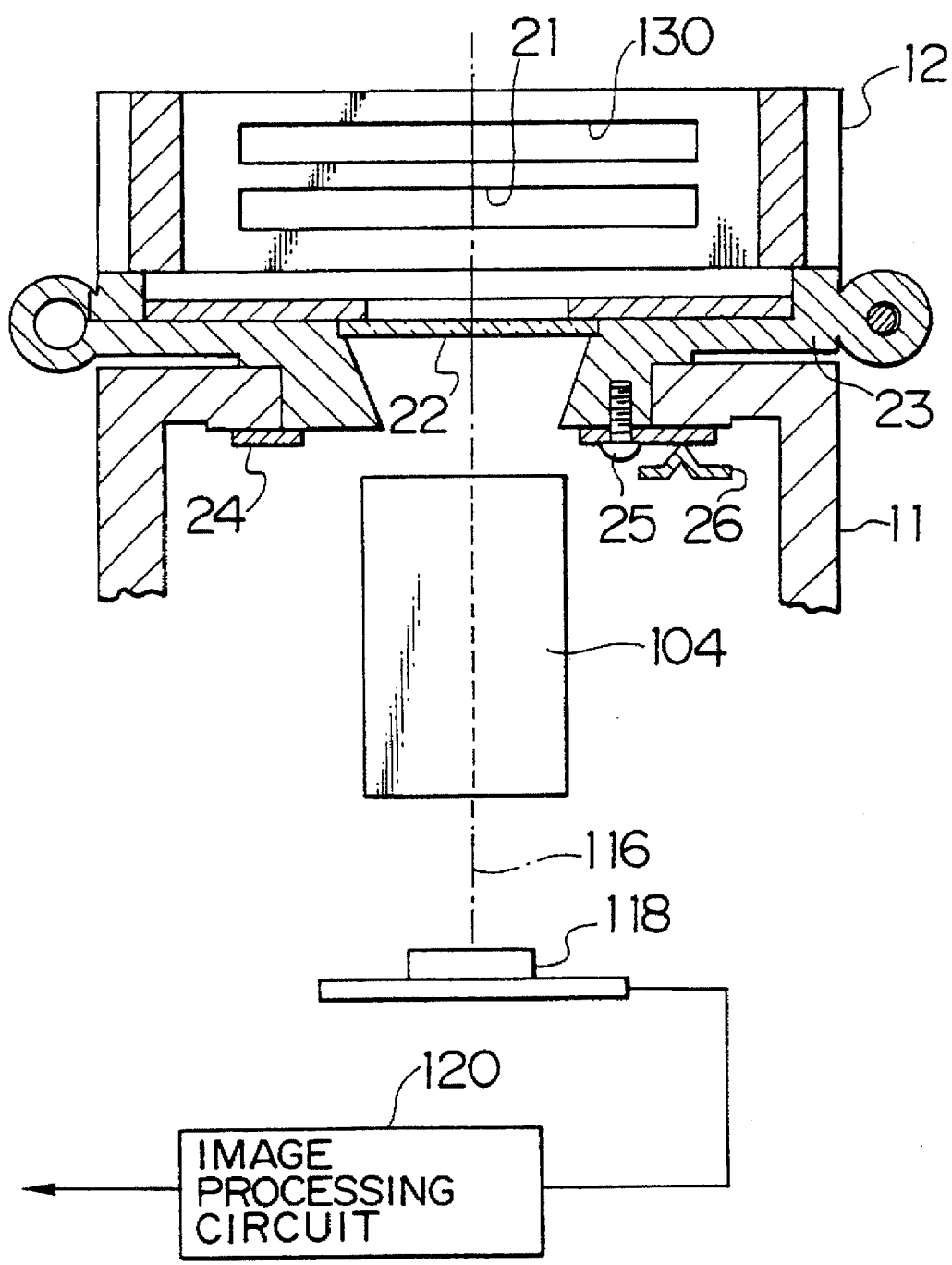
FIG. 11 is a sectional view in a vicinity of the holder illustrating the other embodiment of the electronic viewer.

FIG. 11 is a sectional view in a vicinity of the holder illustrating the other embodiment of the electronic viewer. The same marks are put on the same or similar members to those of the embodiment which is shown in FIG. 5, and an explanation of them is omitted here.

In the electronic viewer of FIG. 11, the optical system 104 and the CCD 118 are fixed within the main body 11, and another slits 130 and 130 are formed above the slits 21 and 21. The slits 130 are used for displaying the vertical image on the film. When the film carrier 90 is inserted into the slits 21, the magnification is set for displaying the lateral image on a TV monitor. At the time of displaying the vertical image, the film carrier 90 is inserted into the slits 130. Also, the holder 12 is rotated by 90° around an optical axis 116 of the optical system 104 so as to erect the vertical image. The distance between a light acceptance surface of the CCD 118 and the film in the film carrier 90 is longer than the case that the film carrier is inserted into the slits 21. That is, the magnification is set as a low magnification for displaying the vertical image without missing parts.

As has been described above, according to the electronic viewer of the present invention, only if the holder is rotated, the magnification for displaying the image can be changed by a simple operation.

Furthermore, according to the electronic viewer of the present invention, the magnification for displaying the image is changed in association with a rotation of the holder, so an image can be erect without missing parts with a simple operation and the displayed image does not have a missing portion.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. An electronic viewer picking up a film image on a film housed in a film carrier so as to display the film image on a screen of a display unit being connected therewith, the viewer comprising:

a main body;

illuminating means for illuminating the film image on the film;

a lens mount including an optical system therein, the film being positioned between the lens mount and the illuminating means, the lens mount capable of moving within the main body;

a solid state imaging device secured to the lens mount in such a manner to be positioned below the optical system, the solid state imaging device accepting an optical image from the optical system and generating an image signal indicating the optical image;

an image processing circuit provided within the main body, the image processing circuit receiving the image signal from the solid state imaging device and converting the signal into a video signal, the video signal being transmitted to the display unit;

a holder for holding the film carrier, the holder provided on a top of the main body in such a manner to be positioned above the optical system, the holder capable of being rotated around an optical axis of the optical system, the film carrier capable of being inserted into and retracted from the holder; and a zoom mechanism for automatically moving the lens mount together with the solid state imaging device along the optical axis of the optical system in association with a rotation of the holder in order to change a distance between the film held by the holder and a light acceptance surface of the solid state imaging device.

2. The electronic viewer according to claim 1, wherein the zoom mechanism sets a first magnification for completely displaying a lateral image of the film on the screen of the display unit when the holder is positioned at a first position, and the zoom mechanism automatically moves the lens mount so as to set a second magnification for completely displaying a vertical image of the film on the screen when the holder is rotated from the first position to a second position.

3. The electronic viewer according to claim 2, wherein said zoom mechanism comprises;

a cam cylinder extended from a base member of the holder, the lens mount being inserted into the cam cylinder;

a guide cylinder secured to the main body, the cam cylinder being inserted into the guide cylinder; and a guide pin screwed in the lens mount through a guide groove of the guide cylinder and a cam groove of the cam cylinder.

4. An electronic viewer according to claim 1, wherein the holder can be rotated continuously over a range of at least 90°.

5. An electronic viewer picking up a film image on a film housed in a film carrier so as to display the film image on a screen of a display unit being connected therewith, the viewer comprising:

a main body;

illuminating means for illuminating the film image on the film;

an optical system fixed within the main body, the film being positioned between the illuminating means and the optical system;

a solid state imaging device fixed within the main body below the optical system, the solid state imaging device accepting an optical image from the optical system and generating an image signal indicating the optical image;

an image processing circuit provided in the main body, the image processing circuit receiving the image signal from the solid state imaging device and converting the signal into a video signal, the video signal transmitted to the display; and a holder for film carrier capable of being rotated around an optical axis of the optical system, the holder provided on a top of the main body in such a manner to be positioned above the optical system, two first slits oppositely provided in the holder, and two second slits oppositely provided above each of the first slits, the film carrier capable of being inserted into and retracted from the first or second slits.

6. The electronic viewer according to claim 5, wherein a first magnification for completely displaying a lateral image of the film on the screen of the display unit is set when the film carrier is inserted into the first slits, and a second magnification for completely displaying a vertical image of the film on the screen is set when the film carrier is inserted into the second slits.

7. An electronic viewer according to claim 4, wherein when the film carrier is inserted in the first slits, the holder is rotated by 90° from a position of the holder when the film carrier is inserted in the second slits.

8. A method of picking up a film image on a film housed in a film carrier so as to display the film image on a screen of a display unit being connected therewith, comprising the steps of:

positioning a lens mount including an optical system therein within a main body;

positioning the film between the lens mount and an illumination source;

illuminating the film image on the film with the illumination source;

securing a solid state imaging device to the lens mount in such a manner to be positioned below the optical system, delivering an optical image from the optical system to the solid state imaging device;

generating an image signal indicating the optical image via the solid state imaging device;

delivering the image signal from the solid state imaging device to an image processing circuit;

converting, via the image processing circuit, the image signal into a video signal;

providing a holder for holding the film carrier on a top of the main body in such a manner to be positioned above the optical system, the film carrier capable of being inserted into and retracted from the holder;

rotating the holder around an optical axis of the optical system;

automatically moving the lens mount together with the solid state imaging device along the optical axis of the optical system in association with the rotation of the holder in order to change a distance between the film held by the holder and a light acceptance surface of the solid state imaging device; and transmitting the video signal to the display unit.

9. The method according to claim 8, further comprising:

setting a first magnification for completely displaying a lateral image of the film on the screen of the display unit when the holder is positioned at a first position;

said automatically moving including automatically moving the lens mount so as to set a second magnification for completely displaying a vertical image of the film on the screen when the rotating step rotates the holder form the first position to a second position.

10. The method according to claim 9, wherein the first position and the second position may be separated by up to 90° of rotation from one another.

11. A method for picking up a film image on a film housed in a film carrier so as to display the film image on a screen of a display unit being connected therewith, the method comprising the steps of:

positioning a lens mount including an optical system therein within a main body;

positioning the film between the lens mount and an illumination source;

illuminating the film image on the film with the illumination source;

securing a solid state imaging device to the lens mount in such a manner to be positioned below the optical system, delivering an optical image from the optical system to the solid state imaging device;

generating an image signal indicating the optical image via the solid state imaging device;

delivering the image signal from the solid state imaging device to an image processing circuit;

converting, via the image processing circuit, the image signal into a video signal;

providing a holder for holding the film carrier on a top of the main body in such a manner to be positioned above the optical system;

oppositely providing two first slits in the holder and two second slits above each of the first slits, the film carrier capable of being inserted into and retracted from the first or second slits;

rotating the holder around an optical axis of the optical system; and transmitting the video signal to the display unit.

12. The method according to claim 11, further comprising:

setting a first magnification for completely displaying a lateral image of the film on the screen of the display unit when the film carrier is inserted into the first slits; and setting a second magnification for completely displaying a vertical image of the film on the screen is set when the film carrier is inserted into the second slits.

13. The method according to claim 11, wherein the rotating step includes rotating the holder by 90° when the film carrier is moved from the first slits to the second slits.

* * * * *